United States Patent [19]

Keldmann

[11] Patent Number: 4,679,617

[45] Date of Patent: Jul. 14, 1987

[54] CEILING OR WALL UNIT

[75] Inventor: Erick C. V. Keldmann, Bellinge, Denmark

[73] Assignee: Elpan, Aps, Odense M., Denmark

[21] Appl. No.: 698,807

[22] Filed: Feb. 6, 1985

[30] Foreign Application Priority Data

Feb. 6, 1984 [DK] Denmark ................. 516/84

[51] Int. Cl.⁴ .............................................. F28F 1/32
[52] U.S. Cl. ..................................... 165/56; 165/171; 62/263
[58] Field of Search ................. 165/171, 56, 179; 62/285, 263

[56] References Cited

U.S. PATENT DOCUMENTS

| 2,845,252 | 7/1958 | Parkinson et al. | 165/56 |
| 4,144,931 | 3/1979 | Medico, Jr. | 165/48 |
| 4,338,995 | 7/1982 | Shelley | 165/49 |

FOREIGN PATENT DOCUMENTS

| 0078448 | 11/1983 | European Pat. Off. | |
| 3237351 | 5/1983 | Fed. Rep. of Germany . | |
| 658767 | 10/1951 | United Kingdom . | |
| 699906 | 11/1953 | United Kingdom . | |
| 730939 | 6/1955 | United Kingdom . | |
| 769357 | 3/1957 | United Kingdom . | |
| 938888 | 10/1963 | United Kingdom . | |
| 1604571 | 12/1978 | United Kingdom . | |

Primary Examiner—William E. Wayner
Attorney, Agent, or Firm—Fitch, Even, Tabin & Flannery

[57] ABSTRACT

A ceiling or wall unit comprises a plurality of juxtaposed aluminum plates, whereby one rim of each plate is optionally inserted in a groove of an abutting plate. According to the invention, each aluminum plate is provided with at least one cooling pipe shaped integral with the plate, inner longitudinal ribs being provided in the cooling pipe. In this manner the plate can be used for cooling a room, the temperature of which is too high on account of the outdoor temperature or heat-producing machines, the lighting or like equipment. The inner longitudinal ribs of the cooling pipes increase the inner surface of the cooling pipes whereby the dimensions of the pipes and consequently of the plates can be correspondingly reduced.

1 Claim, 4 Drawing Figures

CEILING OR WALL UNIT

FIELD OF THE INVENTION

The invention relates to a ceiling or wall unit comprising a plurality of juxtaposed metal plates, preferably aluminium plates, each plate optionally being inserted in a groove of an abutting plate, and each metal plate being provided with at least one cooling pipe preferably shaped integral with the plate.

BACKGROUND ART

German Offenlegungsschrift No. 3,237,351 discloses a wall construction in the form of a metal plate with integrally formed pipes transporting liquid and provided with longitudinal cooling ribs.

SUMMARY OF THE INVENTION

According to the invention the ribs are provided within the pipe.

In this manner the transfer of heat is improved in such a manner that the dimensions of the pipes can be reduced. As a result, it is possible to reduce the consumption of material.

BRIEF DESCRIPTION OF THE DRAWING

The invention will be described below with reference to the accompanying drawing, in which.

DESCRIPTION OF PREFERRED EMBODIMENTS

Figure 1:
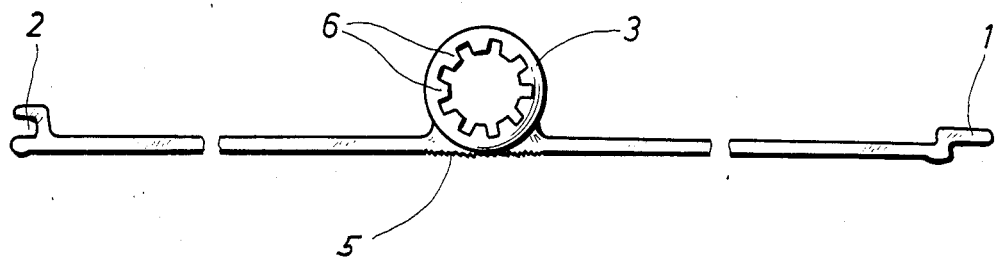
FIG. 1 is a sectional view of some ceiling plates.
Figure 1:
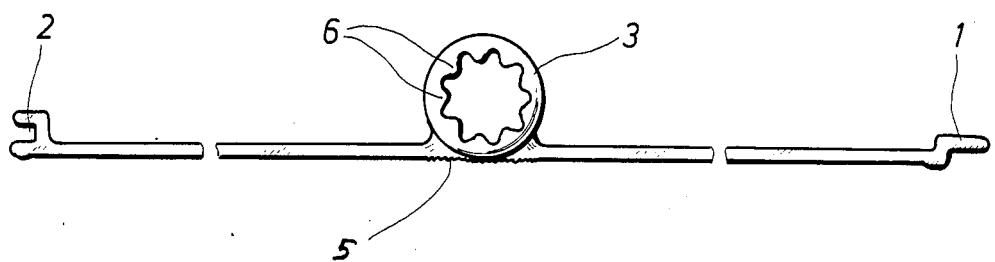
Figure 1:
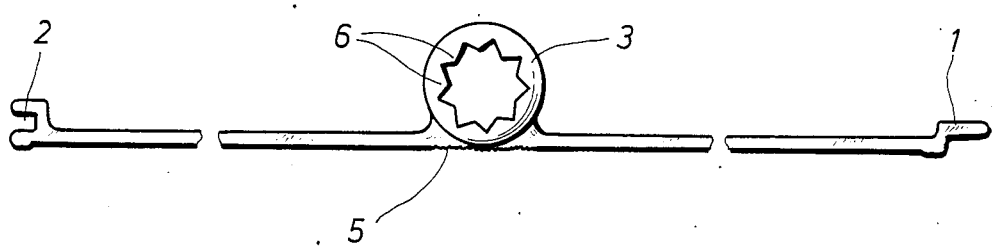
Figure 2:
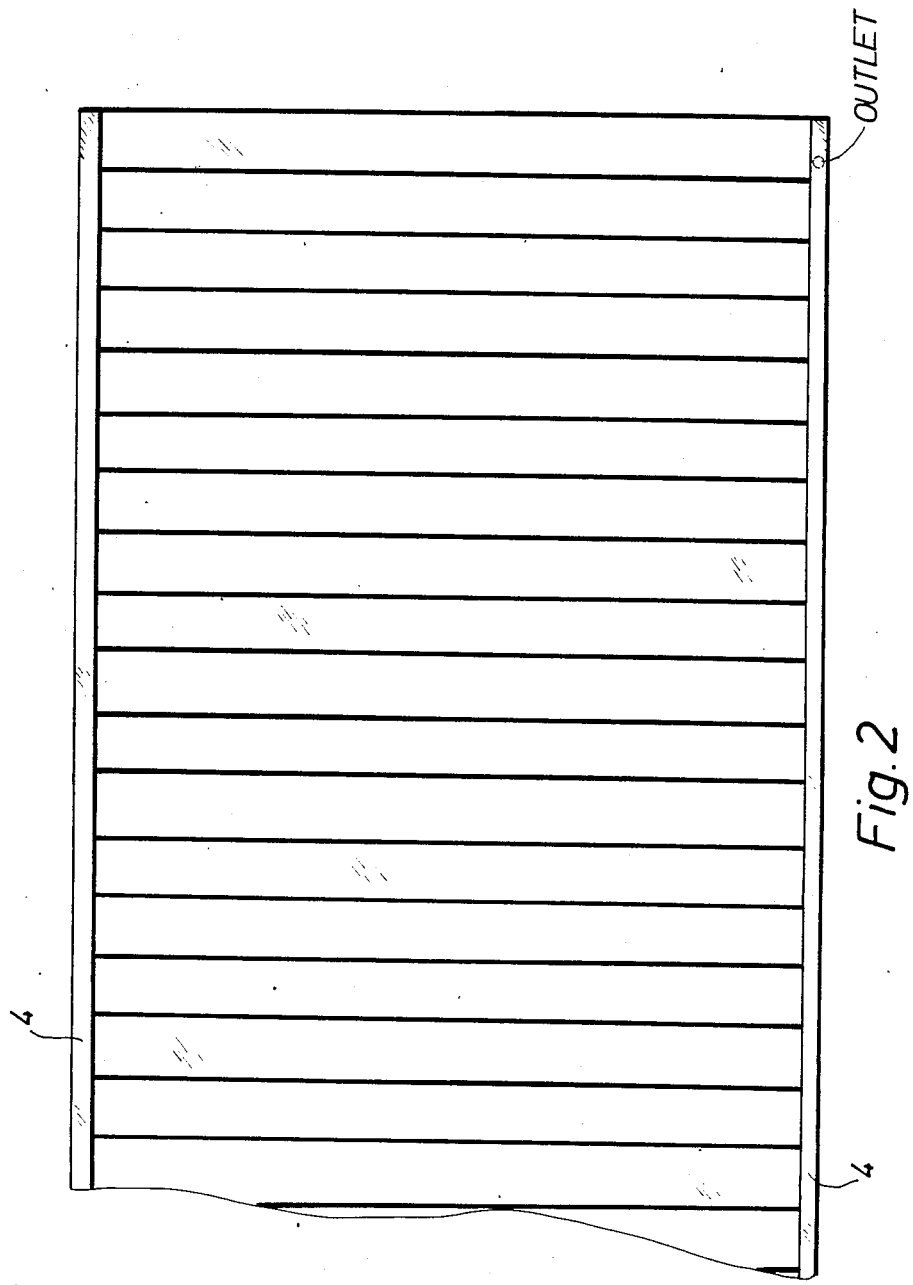
FIG. 2 is a bottom view of a portion of the assembled ceiling unit.
Figure 3:
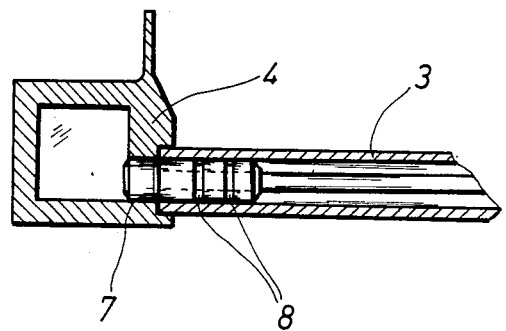
FIG. 3 illustrates the pipe branch.

The ceiling unit of FIGS. 2 and 3 comprises a plurality of juxtaposed metal plates, preferably aluminium plates, cf. FIG. 1. One rim 1 of each plate is inserted in a groove 2 of an abutting plate. Each plate is provided with at least one cooling pipe preferably integrally shaped with the plate. The cooling pipes communicate with transverse pipe portions 4, i.e. manifolds, through pipe stubs, said transverse pipe portions simultaneously assisting at the suspension. These pipes comprise both an inlet and an outlet. The cooling liquid is preferably water of a temperature of 12°-25° C., preferably 12°-15° C., the water circulating in a closed circuit including a conventional refrigerator. The cooling plates are preferably made of anodized, extruded aluminium providing a maximum absorption of radiation heat as well as a maximum heat conduction to the cooling pipes 3. The cooling pipes are according to the invention provided with inner longitudinal ribs 6 increasing the inner surface of the cooling pipes, whereby the dimensions of the pipes can be reduced correspondingly. Each plate is of a length of about 120 cm and a width of about 10 cm. The plates are assembled in groups of a width of about 120 cm and a length of up to 300 cm. Each plate is of a thickness of 1.0-1.5 mm, whereas the pipes may be of an inner diameter so small as 8 mm as a consequence of the relatively great inner surface.

The dimensions of the pipes are calculated on the basis of yield and pressure drop across the groups, the pumping capacity of the cold water device as well as of the pressure nomogram for the pipes. As far as small systems are concerned, the pipe installation may be manufactured of 22 mm pipes and with connections made of 12 mm pipes. The groups of plates can be individually adjusted by means of valves mounted directly on the groups.

Fine ribs are provided on the underside of each plate, said ribs increasing the absorbing surface and making possible formations of dew invisible.

Figure 4:
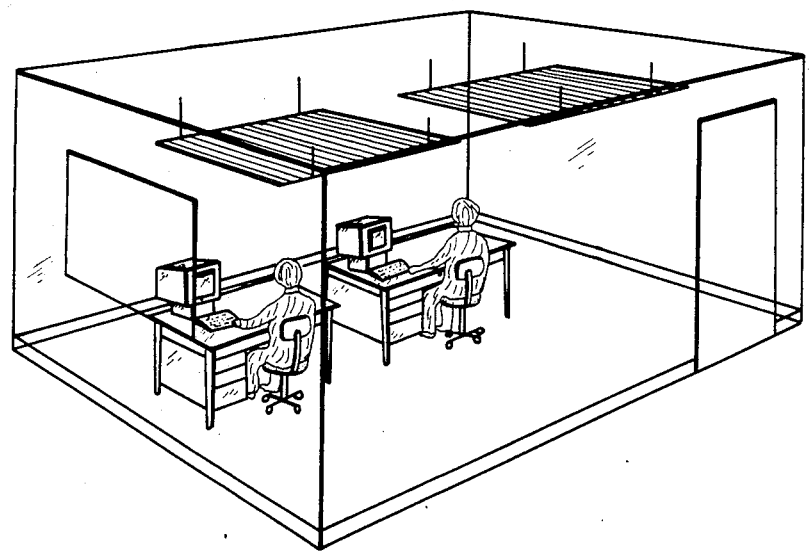
FIG. 4 illustrates an example of a suspension of a ceiling unit.

Usually the groups of plates are suspended over the working environments and/or persons encumbered with a heat problem, cf. FIG. 4. The idea is primarily to cover the human requirements as to transmission of heat. It is considered a secondary feature to cool the room. The heat absorption of the surface is about 200 W/m$^2$ which corresponds to a supply-pipe temperature of about 15° C. and a return temperature of about 18° C. and a circulating amount of water of about 50 l/h.

As an alternative, the lamella unit can be used in connection with a partition, whereby a drain for condensed water is provided at the bottom thereof.

According to a particularly advantageous embodiment, the ribs extend along a helical line. In this manner the laminar flow is maintained at the same time as the liquid is rotating. As a result, the transfer of heat is improved without increasing the pressure drop across the pipe. The pitch of the helical line may vary. The ribs are not necessarily square as illustrated at the top of FIG. 1. As an alternative, they may be trapezoidal or rounded or for instance sinusoidal or dovetailed.

Each plate is preferably manufactured through extrusion.

The pipe branch, cf. FIG. 3, is composed of an aluminum tube having an outer thread 7 for screwing in in a transverse channel portion 1 and a smooth portion for insertion in the cooling channel 3 where the ribs are bored. The smooth portion is provided with two circumferential grooves 8. The pipe branch is glued to the cooling channel 3. It is very important that the glue is distributed uniformly. This is obtained by means of the thread 7 and the grooves 8, both the thread and the grooves forming rings of air space with low pressure where the glue is received and makes sealing rings.

The ceiling or wall unit according to the invention may be varied in many ways without thereby deviating from the scope of the invention.

The cooling pipes are not necessarily circular, but may also be square or semicircular.

The ceiling or wall unit may alternatively be used as a heating unit.

I claim:

1. Heat transfer apparatus comprising:
   a plurality of integral extruded metal modules, each said module comprising an elongated, substantially circular pipe and an elongated, generally planar and rectangular plate;
   a pair of elongated manifolds extending transversely of said modules at respective opposite ends thereof;
   a plurality of pipe stubs interconnecting said manifolds with the pipes of said modules; and
   means disposed on said manifolds for supporting said apparatus;
   each said substantially circular pipe having a predetermined outer diameter and having an inner diameter of the order of 8 mm, and being provided with longitudinal inner ribs;
   each said plate having first and second elongated, parallel edges having means formed thereon for structural connection of adjacent plates to one another;

each said plate having its associated pipe attached to one side thereof and having on its opposite side a surface comprising a pair of elongated, substantially planar portions extending the length of the plate, and a plurality of longitudinally-oriented ribs disposed therebetween.

* * * * *